United States Patent
Burkland

(10) Patent No.: US 10,338,187 B2
(45) Date of Patent: Jul. 2, 2019

(54) SPHERICALLY CONSTRAINED OPTICAL SEEKER ASSEMBLY

(71) Applicant: RAYTHEON COMPANY, Waltham, MA (US)

(72) Inventor: Michael K. Burkland, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 241 days.

(21) Appl. No.: 15/403,345

(22) Filed: Jan. 11, 2017

(65) Prior Publication Data

US 2018/0364324 A1 Dec. 20, 2018

(51) Int. Cl.
| | |
|---|---|
| G01S 3/783 | (2006.01) |
| F41G 7/00 | (2006.01) |
| F41G 7/22 | (2006.01) |
| G01S 3/00 | (2006.01) |

(52) U.S. Cl.
CPC .............. *G01S 3/783* (2013.01); *F41G 7/008* (2013.01); *F41G 7/2213* (2013.01); *F41G 7/2253* (2013.01); *F41G 7/2293* (2013.01); *F41G 7/226* (2013.01)

(58) Field of Classification Search
CPC ........ G01S 3/783; F41G 7/2213; F41G 7/008; F41G 7/2253; F41G 7/226; F41G 7/2293; H01Q 15/08; H01Q 3/04; H01Q 3/14; H01Q 3/12
See application file for complete search history.

(56) References Cited

U.S. PATENT DOCUMENTS

| | | | | | |
|---|---|---|---|---|---|
| 2,576,182 | A | * | 11/1951 | Wilkinson, Jr. ......... | H01Q 3/14 342/158 |
| 3,543,271 | A | * | 11/1970 | Scheel ..................... | H01Q 3/14 343/705 |
| 3,787,856 | A | * | 1/1974 | Pyrah ....................... | H01Q 3/12 342/11 |
| 4,457,475 | A | * | 7/1984 | Ahlstrom .............. | F41G 7/2293 244/3.15 |
| 4,531,129 | A | * | 7/1985 | Bonebright .............. | H01Q 3/04 342/417 |
| 5,047,776 | A | * | 9/1991 | Baller .................... | H01Q 15/08 342/52 |
| 6,262,688 | B1 | * | 7/2001 | Kasahara ............... | H01Q 15/08 343/765 |

(Continued)

OTHER PUBLICATIONS

International Search Report in Application No. PCT/US2017/049084 dated Jun. 19, 2018.

*Primary Examiner* — Bernarr E Gregory
(74) *Attorney, Agent, or Firm* — Lando & Anastasi, LLP

(57) ABSTRACT

A spherically constrained optical seeker assembly includes a spherical lens having an outer surface, an optical sensor assembly associated with the spherical lens, and a gimbal assembly. The optical sensor assembly is coupled to the gimbal assembly. The gimbal assembly is configured to move the optical sensor assembly to at least one desired position on the outer surface of the spherical lens. A method of manipulating the optical sensor assembly includes positioning the optical sensor assembly with respect to the spherical lens and moving the optical sensor assembly to at least one desired position with respect to the outer surface of the spherical lens by the gimbal assembly.

15 Claims, 6 Drawing Sheets

(56) References Cited

U.S. PATENT DOCUMENTS

| | | | |
|---|---|---|---|
| 6,266,029 B1 * | 7/2001 | Lee | H01Q 15/08 343/754 |
| 6,313,951 B1 | 11/2001 | Manhart et al. | |
| 6,326,759 B1 | 12/2001 | Koerner et al. | |
| 6,333,718 B1 * | 12/2001 | Poncel | H01Q 3/14 343/753 |
| 6,380,904 B1 * | 4/2002 | Ogawa | H01Q 3/14 343/754 |
| 6,396,233 B1 | 5/2002 | Christison et al. | |
| 6,473,050 B2 * | 10/2002 | Foncin | H01Q 3/14 343/754 |
| 7,061,448 B2 * | 6/2006 | Kuroda | H01Q 15/08 343/753 |
| 7,185,845 B1 | 3/2007 | Hartman et al. | |
| 7,221,328 B2 * | 5/2007 | Kuroda | H01Q 3/04 343/753 |
| 7,348,934 B2 * | 3/2008 | Kuroda | H01Q 15/08 343/911 L |
| 7,894,144 B2 | 2/2011 | Wein et al. | |
| 8,447,550 B1 | 5/2013 | Burkland | |
| 8,471,757 B2 * | 6/2013 | Yonemoto | H01Q 15/08 340/907 |
| 2013/0110440 A1 | 5/2013 | Burkland | |

* cited by examiner

SPHERICALLY CONSTRAINED OPTICAL SEEKER ASSEMBLY

BACKGROUND OF THE INVENTION

1. Field of the Invention

This invention relates to guided projectiles that engage targets by detecting and following laser light scattered from the targets, or passively by optically imaging targets, and more particularly by employing a spherically constrained optical seeker assembly used in guided projectiles.

2. Description of the Related Art

Laser guided ordinance is commonly used to engage point targets with a high probability of success and minimal collateral damage. Such ordinance includes guided artillery projectiles, guided missiles, and guided bombs, all of which will be referred to herein as "projectiles."

A guidance system of a laser guided projectile typically includes a semi-active laser (SAL) seeker, fixed-post or gimbaled, to detect pulsed laser electro-magnetic radiation (EMR) scattered from the intended target and to provide signals indicative of the target bearing and a flight controller that processes the signals to manipulate one or more control surfaces (e.g., fins or canards) to guide the projectile to the target. The SAL seeker includes either a non-imaging or imaging optical system that captures and focuses the scattered laser EMR into a spot onto a segmented non-imaging detector (e.g. a quad-cell detector) or an imaging detector. As the target bearing changes the position of the spot on the detector changes (e.g., a focal plane array). The detector compares the integrated EMR incident on each cell (segment) to calculate a spatial displacement of the centroid of the spot. The effective field-of-view (FOV) is dictated by the central monotonic region of the detector's spatial transfer function (STF) in which the spot is incident on all four cells, which is in turn determined by the spot size. The detector's central monotonic region is commonly referred to as the "linear" region. The seeker maps the spatial displacement $\Delta X$ and $\Delta Y$ along orthogonal axes to Azimuth (AZ), Elevation (EL) angles in a calibration table to select an angle measurement as an estimate of the bearing to target. Such guidance systems are not only limited to SAL applications, but also pertinent to passive imaging systems, such as visible, uncooled bolometers, and the like, where the FOV is imaged via telescopic means onto a Focal Plane Assembly (FPA) comprised of an array of detector elements.

SUMMARY OF INVENTION

One aspect of the present disclosure is directed to a spherically constrained optical seeker assembly. In one embodiment, the optical seeker assembly comprises a spherical lens having an outer surface, an optical sensor assembly associated with the spherical lens, and a gimbal assembly. The optical sensor assembly is coupled to the gimbal assembly. The gimbal assembly is configured to move the optical sensor assembly to at least one desired position on the outer surface of the spherical lens, opposing the FOV which is projected onto the optical sensor by virtue of the focusing property of the spherical lens.

Embodiments of the optical seeker assembly further may include configuring the spherical lens and the gimbal assembly to be mounted in a back shell. The back shell may include a semi-spherical body having an outer edge that defines a plane of the back shell. The gimbal assembly and the spherical lens may be positioned within the back shell with the optical sensor assembly being positioned behind the spherical lens so that the optical sensor assembly has a field of view through the lens. The gimbal assembly may include two arcuate arms configured to move with respect to one another. A first arm of the two arms may include an arcuate body having a first end portion and a second end portion, with the first arm extending vertically to provide azimuthal positioning of the optical sensor assembly during operation. A second arm of the two arms may include an arcuate body having a first end portion and a second end portion, with the second arm extending horizontally to provide elevational positioning of the optical sensor assembly during operation. The body of the first arm can pivot with respect to a first axis defined by the position of the first and second end portions of the first arm along a plane. The body of the second arm can pivot with respect to a second axis defined by the position of the first and second end portions of the second arm along the plane. The optical sensor assembly may include a body and a stem that extends from the body. The body of the optical sensor assembly may include a surface having a plurality of feet configured to engage the outer surface of the spherical lens to focus a sensor of the optical sensor assembly. Each foot of the plurality of feet may be fabricated from low friction material, such as polytetrafluoroethylene. The body of the optical sensor assembly may be configured to support a focal-plane array. The body of the first arm may include an elongated slot formed therein, and the body of the second arm may include an elongated slot formed therein. The slot of the first arm and the slot of the second arm may each be sized and shaped to receive the stem of the optical sensor assembly, with the stem of the optical sensor assembly extending through the slot of the second arm and through the slot of the first arm. The first end portion of the first arm may include a first motor to pivot the first arm with respect to the first axis. The first end portion of the second arm may include a second motor to pivot the second arm with respect to the second axis. The first motor and the second motor may be controlled by a controller to automatically control the pivoting motion of the first and second arms to position the optical sensor assembly in the at least one desired position.

Another aspect of the disclosure is directed to a method of manipulating an optical sensor assembly of a spherically constrained optical seeker assembly. In one embodiment, the method comprising: positioning the optical sensor assembly with respect to positions on the surface of the spherical lens of the optical seeker assembly, the spherical lens having an outer surface; and moving the optical sensor assembly to at least one desired position with respect to the outer surface of the spherical lens by a gimbal assembly.

Embodiments of the method further may include mounting the spherical lens and the gimbal assembly in a back shell, with the back shell including a semi-spherical body having an outer edge that defines a plane of the back shell. Mounting the spherical lens and the gimbal assembly in the back shell may include positioning the gimbal assembly and the spherical lens within the back shell with the optical sensor assembly being positioned behind the spherical lens so that the optical sensor assembly has a field of view projected through the front of the lens. The gimbal assembly may include two arcuate arms configured to move with respect to one another. A first arm of the two arms may include an arcuate body having a first end portion and a second end portion, with the first arm extending vertically to provide azimuthal positioning of the optical sensor assembly during operation. A second arm of the two arms may include an arcuate body having a first end portion and a second end portion, with the second arm extending horizontally to provide elevational positioning of the optical sensor assembly during operation. The method further may include pivoting the body of the first arm with respect to a first axis defined by the position of the first and second end portions of the first arm along a plane, and pivoting the body of the second arm with respect to a second axis defined by the position of the first and second end portions of the second arm along the plane. The body of the first arm may include an elongated slot formed therein, and the body of the second arm may include an elongated slot formed therein. The method further may include positioning a stem of the optical sensor assembly in the slot of the second arm and through the slot of the first arm.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Embodiments of the present disclosure provide a compact, cost-effective structure configured to house an optical sensor assembly and a spherical lens. In one embodiment, a spherically constrained optical seeker assembly includes a spherical lens, an optical sensor assembly, and a gimbal provided to support and manipulate the optical sensor assembly with respect to the spherical lens. The gimbal includes a pair of arms that support a housing of the optical sensor assembly to move the housing to a desired position with respect to the spherical lens during operation.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
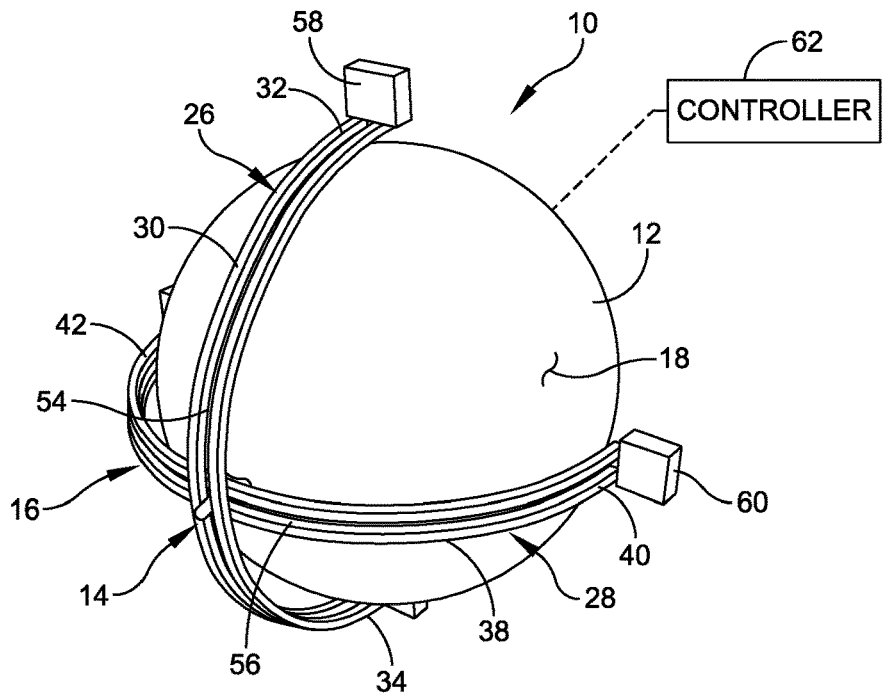
FIG. 1 is a perspective view of a spherically constrained optical seeker assembly of an embodiment of the present disclosure.

Referring to the drawings, and more particularly to FIG. 1, a spherically constrained optical seeker assembly is generally indicated at 10. As shown, the optical seeker assembly 10 includes a spherical lens 12, an optical sensor assembly, generally indicated at 14, and a gimbal assembly, generally indicated at 16. In one embodiment, the spherical lens 12 includes a sphere or a ball, between 2 cm and 5 cm in diameter.

However, it should be understood that the principles associated with the present disclosure can be applied to a lens of any size and shape. A focal length is measured from a center of the spherical lens 12, where the extensions of the entering and exiting rays meet. This means that the focus location is the difference between the focal length and the radius of the spherical lens 12 to an outer surface 18 of the spherical lens. Reference can be made to U.S. Pat. No. 8,447,550, which is assigned to the assignee of the present disclosure, and discloses a projection system using a spherical lens having a first side that is positioned at a location directly in front of exit pupils of projectors. For example focal length can be determined by using the following equation:

$$F = \frac{nR}{2(n-1)} \quad (1)$$

Based on the focal length, optimal placement of the FPA 52 can be determined by using the following equation:

$$F - R = \frac{(2-n)R}{2(n-1)} \quad (2)$$

Figure 1A:
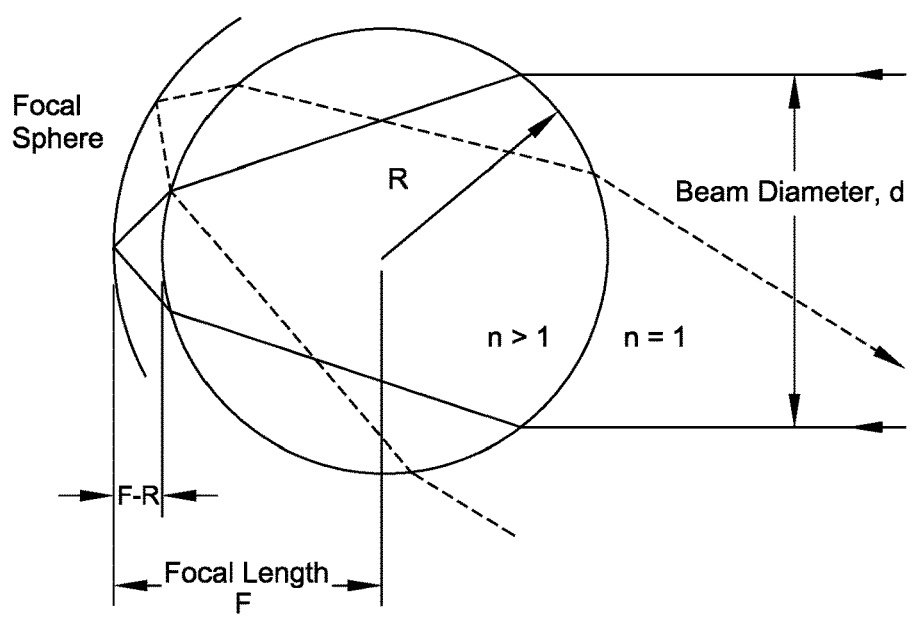
FIG. 1A is the geometric optics of a spherical lens.

Reference can be made to FIG. 1A, which illustrates the focal length and the optical placement calculated by Equations 1 and 2 with respect to the spherical lens 12.

In a certain embodiment, the spherical lens 12 includes one or more materials each having an index of refraction n greater than one and less than or approximately equal to two. For example, the spherical lens 12 may be fabricated any appropriate material, including, but not limited to, zinc selenide, glass, crystal, and polymers. The spherical lens 12 may include a single unitary material or multiple materials of differing indices of refraction, known as a "gradient index spherical lens" or a "Luneberg lens." In some embodiments, the spherical lens 12 can be configured to correct chromatic aberrations by placing a smaller ball within a larger lens, with the smaller ball having a lower refractive index.

Figure 2:
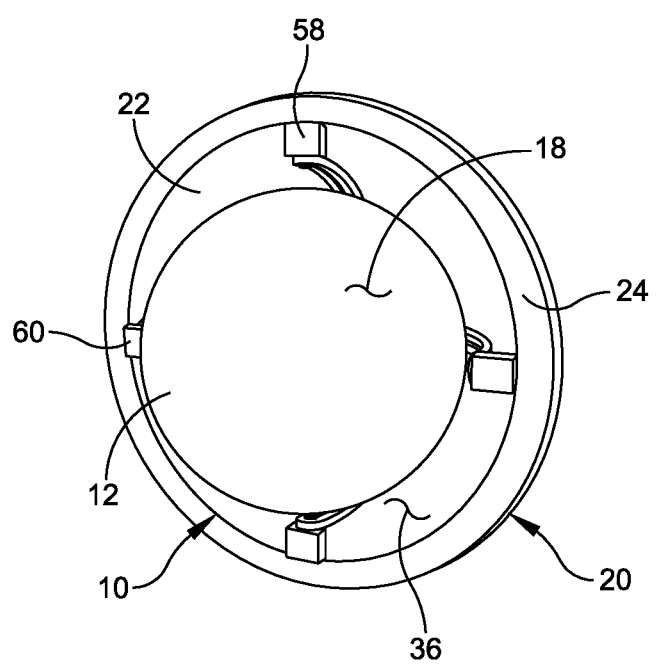
FIG. 2 is a perspective view of the optical seeker assembly disposed within a back shell.
Figure 3:
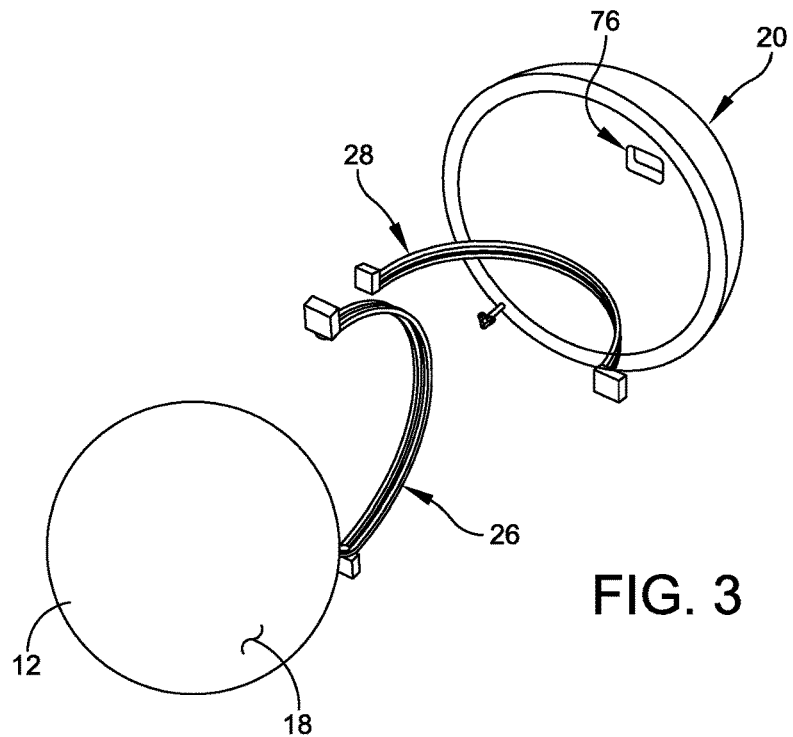
FIG. 3 is an exploded perspective view of the optical seeker assembly and the back shell.

Referring to FIGS. 2 and 3, the optical seeker assembly 10 is shown mounted in a back shell, generally indicated at 20, which is provided to secure the components of the optical seeker assembly in place. In one embodiment, the back shell 20 includes a semi-spherical body 22 having an outer edge or rim 24 that defines a plane of the back shell. The back shell 20 is sized to receive the components of the optical seeker assembly 10, including the spherical lens 12 and the gimbal assembly 16, within a space defined by the body of the back shell. The back shell 20 can be configured to house other components of the optical seeker assembly 10, including the optics, detectors and associated image processing electronics and feedback electronics from the indicators and motor control.

Specifically, the back shell 20 has a number of functions, including providing the structure that is mechanically attached to motors used to move the gimbal assembly 16. The back shell 20 can be used to constrain a radial bending of arms of the gimbal assembly 16. In one embodiment, polytetrafluoroethylene (PTFE) pins can extend from the back of the arms of the gimbal assembly toward an inner surface of the back shell 20. The back shell 20 can be further configured to provide a mechanical interface to the seeker, which attaches to a frame of the projectile. Further, the back shell 20 prevents any stray light from reaching the optics of the optical seeker assembly 10. In certain embodiments, the back shell 20 can be fabricated from any type of metal having structural strength, e.g., aluminum, titanium, and the like. As will be described with reference to FIG. 4A below, the spherical lens 12 can be secured to the back shell 12 by a retaining ring mounted around the aperture, which can be achieved by fabrication of a circular groove or sandwiched between two retaining rings, each of smaller diameter than the ball (one secured to the ball and one secured from the optical seeker assembly 10).

As shown, the spherical lens 12 and the gimbal assembly 16 of the optical seeker assembly 10 are positioned within the back shell 20 with the optical sensor assembly 14 being positioned behind the spherical lens so that the optical sensor assembly has a field of view through the spherical lens. The back shell 20 is suitably secured to a projectile. For example, the back shell 20 can be secured to the projectile by any standard mechanical manner of assembling subsystems, e.g., bolts.

Figure 4:
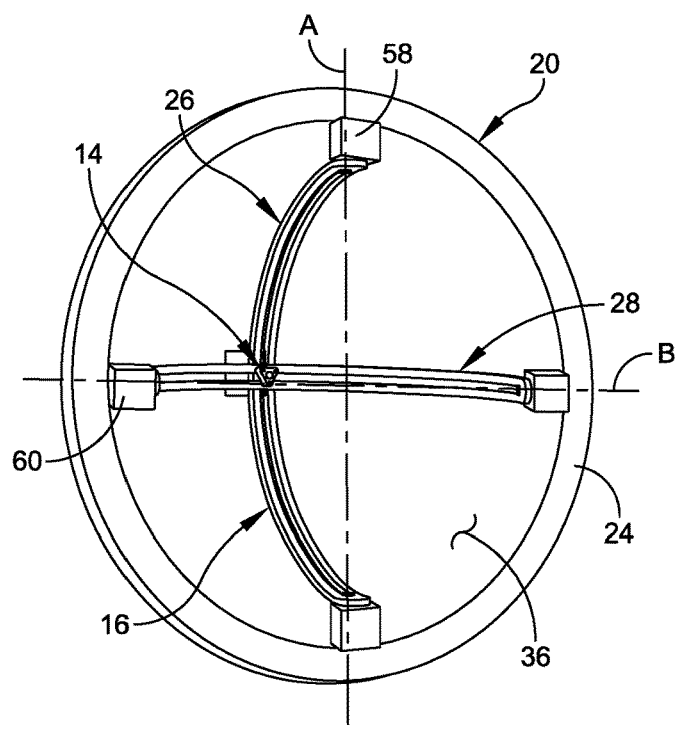
FIG. 4 is a perspective view of a gimbal of the optical seeker assembly and the back shell.
Figure 5:
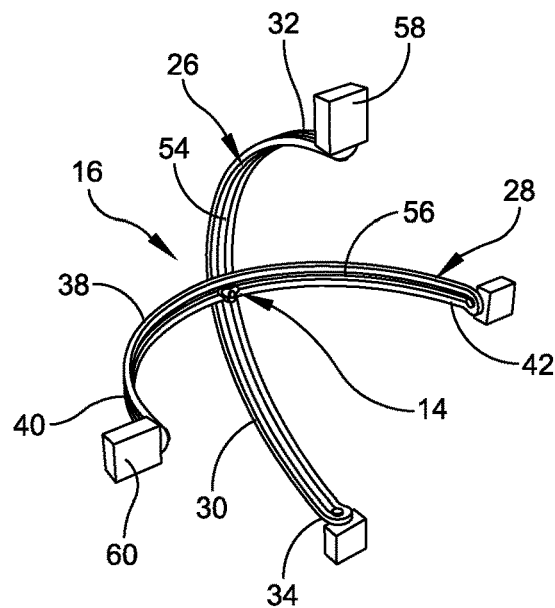
FIG. 5 is a perspective view of the gimbal and an optical sensor assembly of the optical seeker assembly.

FIG. 4 illustrates the gimbal assembly 16 and the optical sensor assembly 14 positioned within the back shell 20. In one embodiment, and with additional reference to FIG. 5, the gimbal assembly 16 includes two arcuate arms, generally indicated at 26, 28, which can be referred to as an azimuthal gimbal arm and an elevational gimbal arm, respectively. A first arm 26, i.e., the azimuthal gimbal arm, includes an arcuate body 30 having a first end portion 32 and a second end portion 34. As shown, the body 30 of the first arm 26 is positioned against an inner surface 36 of the back shell 20, and has a diameter that generally corresponds to a diameter of the inner surface of the back shell. The first and second end portions 32, 34 terminate adjacent the outer edge 24 of the back shell 20 on opposite sides of the back shell. The first arm 26 is shown to vertically extend within the back shell 20, thereby providing lateral positioning of the optical sensor assembly 14 during operation.

Similarly, a second arm 28, i.e., the elevational gimbal arm, includes an arcuate body 38 having a first end portion 40 and a second end portion 42. The body 38 of the second arm 28 is slightly smaller in diameter than the body 30 of the first arm 26, and is positioned within the back shell 20 in front of the first arm so that it is spaced a small distance from the inner surface 36 of the back shell. As shown, the second arm 28 is rotated 90° with respect to the first arm 26. The first and second end portions 40, 42 of the second arm 28 are positioned equidistant between the first and second end portions 32, 34 of the first arm 26. The second arm 28 is shown to horizontally extend within the back shell 20, thereby providing vertical positioning of the optical sensor assembly 14 during operation.

The arrangement is such that the body 30 of the first arm 26 can pivot with respect to a first axis A (FIG. 4) defined by the position of the first and second end portions 32, 34 of the first arm along the plane of the outer edge 24 of the back shell 20. Similarly, the body 38 of the second arm 28 can pivot with respect to a second axis B (FIG. 4) defined by the position of the first and second end portions 40, 42 of the second arm 28 along the plane of the outer edge 24 of the back shell 20. Although the first axis A defined by the first arm 26 is shown to be vertical and perpendicular with respect to the second, horizontal axis B of the second arm 28, the axes can be varied slightly to achieve a desired configuration.

Figure 4A:
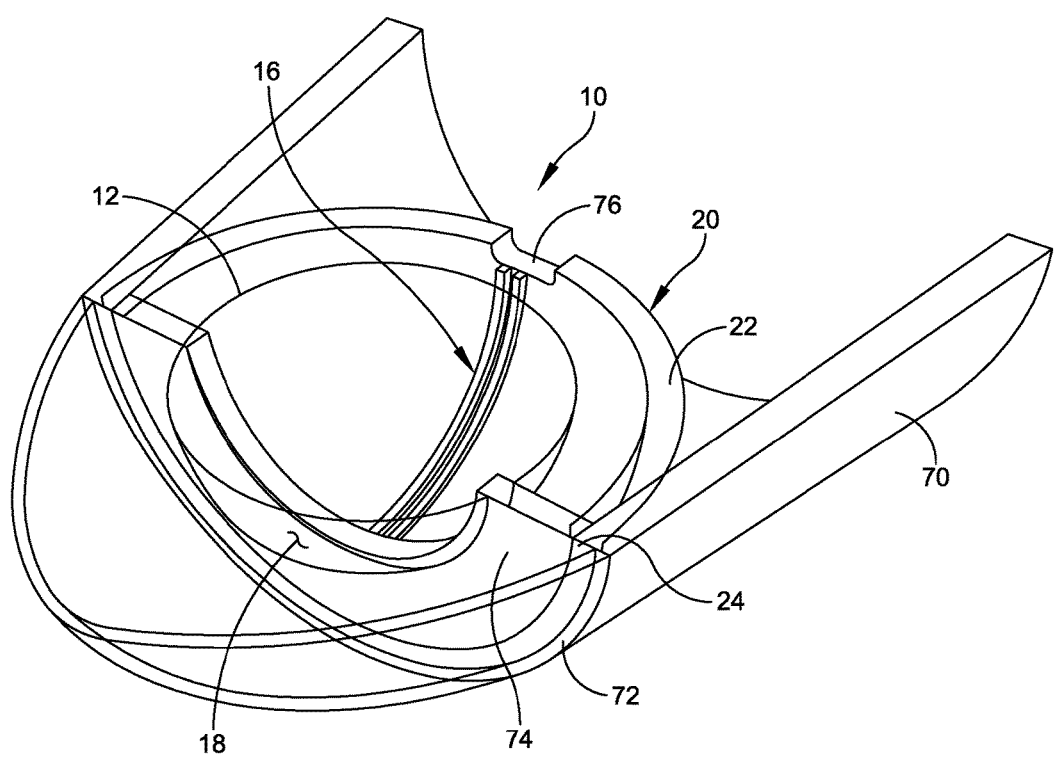
FIG. 4A is a cross-sectional perspective view of the optical seeker assembly positioned within a seeker housing.

Referring to FIG. 4A, the manner in which the optical seeker assembly 10 in a seeker housing 70 will be described. As shown, the body 22 of the back shell 20 is positioned adjacent to an open end 72 of the seeker housing 70. A retaining ring 74 is positioned at the open end 72 of the seeker housing 70 and suitably secured to one of the back shell 20 and the seeker housing. The retaining ring 74 is designed to retain the spherical lens 12, with a center mass of the spherical lens being positioned toward the seeker housing 70. The back shell may be configured with a cutout 76 to accommodate a harness associated with the optical sensor assembly 14 that is coupled to the arms of the gimbal assembly 16.

Figure 6:
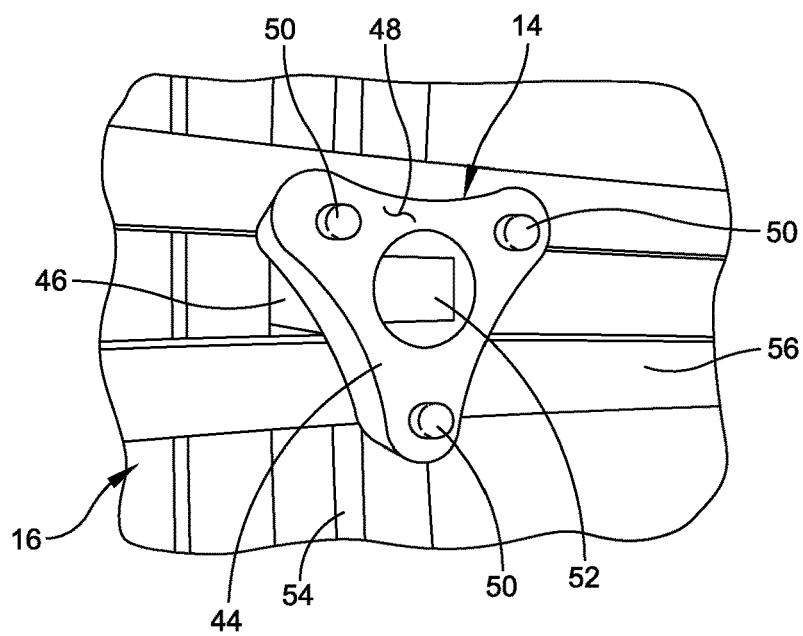
FIG. 6 is an enlarged perspective view of the optical sensor assembly shown in FIG. 5.
Figure 7:
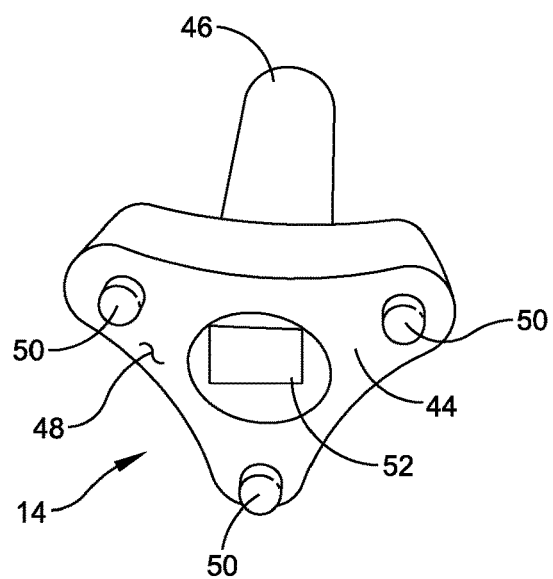
FIG. 7 is an enlarged perspective view of the optical sensor assembly.

Referring to FIGS. 6 and 7, in the shown embodiment, the optical sensor assembly 14 includes a triangular-shaped body 44 and a cylindrical stem 46 that extends from the body. The stem 46 is configured to be supported and moved by the first and second arms 26, 28 of the gimbal assembly 16 in a manner described below. Although shown to be cylindrical, the stem 46 of the optical sensor assembly can assume any shape, e.g., square, rectangular or triangular in cross section, and fall within the scope of the present disclosure.

The body 44 of the optical sensor assembly 14 includes a surface 48 that faces the spherical lens 12 during use. In one embodiment, the surface 48 of the body 44 has three feet, each indicated at 50, which extend away from the surface and are provided at the three respective corners of the triangularly-shaped body. In a certain embodiment, the feet 50, which can be referred to as guides, are fabricated from low friction material, such as PTFE or any other suitable, low friction material. The feet function as means of focusing by extension or contraction of any or all of the feet 50 with respect to the body 44 of the optical sensor assembly 14 and the outer surface 18 of the spherical lens 12.

As shown, the body 44 of the optical sensor assembly 14 is designed to support an FPA or focal-plane 52, which is an image sensing device consisting of an array (typically rectangular) of light-sensing pixels at a focal plane of a lens. Typical applications of infrared FPAs include missile or related weapons guidance sensors. For example, in one application, infrared-sensitive materials commonly used in IR detector arrays include mercury cadmium telluride (HgCdTe), indium antimonide (InSb), indium gallium arsenide (InGaAs), and vandium (V) oxide (VOx). Other applications, such as visible imaging application, can be applied as well, such as silicon complementary metal-oxide-semiconductor (CMOS) and/or charged-coupled device (CCD) technologies. In a typical FPA, a set of functions is implemented on a chip called a multiplexer or readout integrated circuit (ROIC), and is typically fabricated in silicon using standard CMOS processes. The detector array is then hybridized or bonded to the ROIC, typically using indium bump-bonding, and the resulting assembly is called an FPA.

The optical sensor assembly 14 can be configured to support non-imaging detectors. For example, in another embodiment, the optical sensor assembly 14 can be configured to support a quad cell detector that is typical of the SAL sensor. Additionally, the optical sensor assembly 14 can be configured to contain and support a spectral filter and/or corrective optics that may be necessary for a given configuration. Although FPA 52 is shown to be rectangular, the imaging or non-imaging detector can be circular.

Electrical power is supplied to the optical sensor assembly 14 and data is transferred from the optical sensor assembly to processing electronics contained aft of the back shell 20 by a number of configurations. For example, power can be supplied via (1) either arm assembly with electrical contacts extending from the arm (arm 26 or arm 28) to the optical sensor assembly 14, (2) from a harness attached to the back of the optical sensor assembly and extending through the opening of the back shell 30 (see FIG. 4), or (3) through wireless means by induction coils radiating from the back shell to the optical sensor assembly. Data can be transferred by signals from the optical sensor assembly 14 (1) electrical contacts from the optical sensor assembly can be formed with one of the gimbal arms (arm 26 or arm 28)—preferably the opposite that would supply the power if used—transmitted through a corresponding motor assembly to imaging processing via the back shell 30, (2) via a gimbal harness extending from the optical sensor assembly through the back shell opening (see FIG. 4), or (3) wirelessly as transmitted from the optical sensor assembly to a received placed within the missile guidance housing assembly.

In one embodiment, the body 30 of the first arm 26 includes an elongated slot or track 54 formed therein. The slot 54 is sized and shaped to receive the stem 46 of the optical sensor assembly 14 in the manner described below. For example, the stem 46 of the optical sensor assembly 14 can include a feature that mates with a corresponding feature associated with the slot 54 of the body 30 of the first arm 26 to retain the stem within the slot during operation of the optical seeker assembly 10. Similarly, the body 38 of the second arm 28 includes an elongated slot 56 formed therein, which is sized to receive the stem 46 of the optical sensor assembly 14. As with the first arm 26, the stem 46 of the optical sensor assembly 14 can include a feature that mates with a corresponding feature associated with the slot 56 of the body 38 of the second arm 28 to retain the stem within the slot during operation of the optical seeker assembly 10. As shown in FIG. 1, the stem 46 of the optical sensor assembly 14 extends through the slot 56 of the second arm 28 and then through the slot 54 of the first arm 26. Thus, an angular position of the FPA 52 of the optical sensor assembly 14 can be changed by pivoting the first arm 26 and the second arm 28.

In a certain embodiment, the first end portion 32 of the first arm 26 includes a first motor 58 to pivot the first arm with respect to the first axis A. Similarly, the first end portion 40 of the second arm 28 includes a second motor 60 to pivot the second arm with respect to the second axis B. In a certain embodiment, azimuthal and elevational positioning are established by encoders provided on the hinged first and second arms 26, 28, antipodal of the motors 58, 60, e.g., adjacent to the second end portion 34 of the first arm and the second end portion 42 of the second arm, respectively. The motors 58, 60 are coupled to a controller 62 (FIG. 1) to automatically control the pivoting motion of the first and second arms 26, 28 thereby being able to position the optical sensor assembly 14 in a desired position with respect to the spherical lens 12. In one embodiment, the controller 62 may be part of the each of the first end portion 32 of the first arm 26 and the first end portion 40 of the second arm 28 can include a power supply and other connections required to power the pivotal movement of the first arm and the second arm. Also, control of the motors 58, 60 can be achieved by wired or wireless configuration. As mentioned above, the first arm 26 and the second arm 28 can be configured with guide pins to restrain the arms to the back shell 20 in a radial direction. One advantage of the structure provided by the first arm 26 and the second arm 28 of the gimbal assembly 16 is that the only component necessary to rotate about gimbal assembly is the imaging portion of the sensor, i.e., the FPA 52. All other downstream electronic components associated with image processing, detector control and power can be off-board, meaning that these components can be stationary on the seeker housing.

Figure 8:
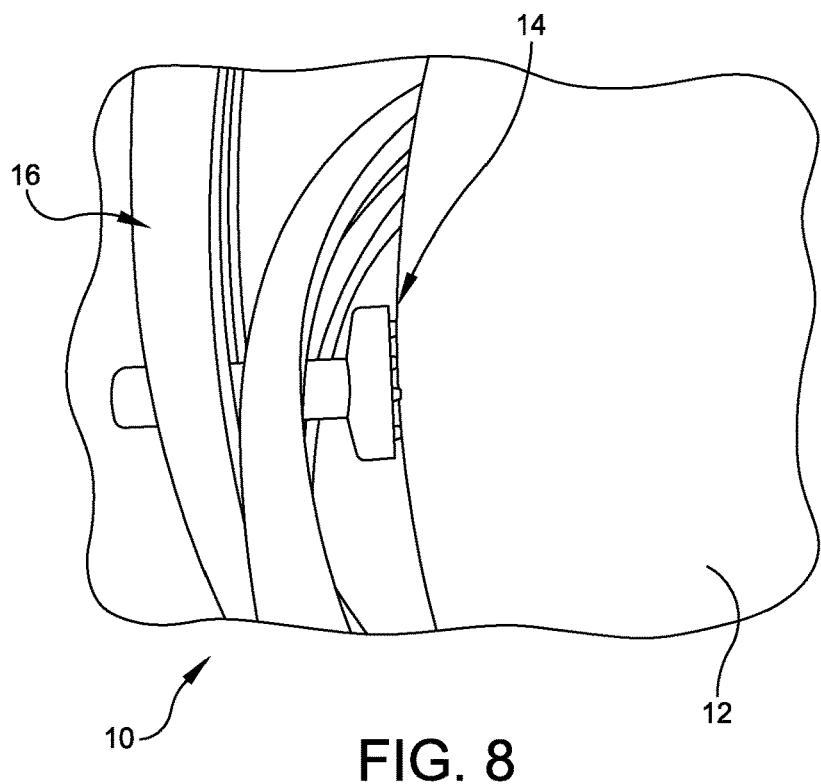
FIG. 8 is an enlarged perspective view of the optical sensor assembly adjacent to a spherical lens of the optical seeker assembly.

Referring to FIG. 8, a distance the FPA 52 with respect to the outer surface 18 of the spherical lens 12 is controlled by the spacing of the feet 50 of the body 44 of the optical sensor assembly 14 and the positioning of the FPA within the body of the optical sensor assembly.

In addition, as mentioned above, the angular position of the FPA 52 with respect to the outer surface 18 of the spherical lens 12 is controlled by moving the first arm 26 and the second arm 28 of the gimbal assembly 16 under the control of the controller 62 and by manipulating the motors 58, 60 of the first arm and the second arm.

Embodiments of the spherically constrained optical sensor assembly utilize imaging properties of a refractive spherical lens, with mechanical motion of an FPA along the spherical imaging field of the optic. Latitude and longitude half-circumference arms provide the elevational and azimuthal positioning of the sensor assembly constrained by the intersection of the first and second arms.

Accordingly, the gimballed FPA is free to move generally in any direction. The optical seeker assembly can be configured under the control of the controller to provide a plurality of gimbal drive signals/commands in reference to vertical and horizontal axes of the missile's seeker body.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A spherically constrained optical seeker assembly comprising:

a spherical lens having an outer surface;
an optical sensor assembly associated with the spherical lens; and
a gimbal assembly, the optical sensor assembly being coupled to the gimbal assembly, the gimbal assembly being configured to move the optical sensor assembly to at least one desired position on the outer surface of the spherical lens, the gimbal assembly including two arcuate arms configured to move with respect to one another, a first arm of the two arms including an arcuate body having a first end portion and a second end portion, the first arm extending vertically to provided azimuthal positioning of the optical sensor assembly during operation, and a second arm of the two arms includes an arcuate body having a first end portion and a second end portion, the second arm extending horizontally to provide elevational positioning of the optical sensor assembly during operation,
wherein the optical sensor assembly includes a body and a stem that extends from the body, the body of the optical sensor assembly including a surface having a plurality of feet configured to engage the outer surface of the spherical lens and to extend and retract to focus a sensor of the optical sensor assembly.

2. The optical seeker assembly of claim 1, wherein the spherical lens and the gimbal assembly are configured to be mounted in a back shell, the back shell including a semi-spherical body having an outer edge that defines a plane of the back shell.

3. The optical seeker assembly of claim 2, wherein the gimbal assembly and the spherical lens are positioned within the back shell with the optical sensor assembly being positioned behind the spherical lens so that the optical sensor assembly has a field of view through the lens.

4. The optical seeker assembly of claim 1, wherein the body of the first arm is configured to pivot with respect to a first axis defined by the position of the first and second end portions of the first arm along a plane, and the body of the second arm is configured to pivot with respect to a second axis defined by the position of the first and second end portions of the second arm along the plane.

5. The optical seeker assembly of claim 1, wherein each foot of the plurality of feet is fabricated from low friction material, such as polytetrafluoroethylene, and is configured to extend or contract.

6. The optical seeker assembly of claim 1, wherein the body of the optical sensor assembly is configured to support an imaging or non-imaging detector.

7. The optical seeker assembly of claim 1, wherein the body of the first arm includes an elongated slot formed therein, and the body of the second arm includes an elongated slot formed therein.

8. The optical seeker assembly of claim 7, wherein the slot of the first arm and the slot of the second arm are each sized and shaped to receive the stem of the optical sensor assembly, the stem of the optical sensor assembly extending through the slot of the second arm and through the slot of the first arm.

9. The optical seeker assembly of claim 8, wherein the first end portion of the first arm includes a first motor to pivot the first arm with respect to the first axis, and the first end portion of the second arm includes a second motor to pivot the second arm with respect to the second axis.

10. The optical seeker assembly of claim 9, wherein the first motor and the second motor are controlled by a controller to automatically control the pivoting motion of the first and second arms to position the optical sensor assembly in the at least one desired position.

11. A method of manipulating an optical sensor assembly of a spherically constrained optical seeker assembly, the method comprising:
positioning the optical sensor assembly with respect to a spherical lens of the optical seeker assembly, the spherical lens having an outer surface; and
moving the optical sensor assembly to at least one desired position with respect to the outer surface of the spherical lens by a gimbal assembly,
wherein the gimbal assembly includes two arcuate arms configured to move with respect to one another, a first arm of the two arms including an arcuate body having a first end portion and a second end portion, the first arm extending vertically to provided azimuthal positioning of the optical sensor assembly during operation, and a second arm of the two arms includes an arcuate body having a first end portion and a second end portion, the second arm extending horizontally to provide elevational positioning of the optical sensor assembly during operation, and
wherein the optical sensor assembly includes a body and a stem that extends from the body, the body of the optical sensor assembly including a surface having a plurality of feet configured to engage the outer surface of the spherical lens and to extend and retract to focus a sensor of the optical sensor assembly.

12. The method of claim 11, further comprising mounting the spherical lens and the gimbal assembly in a back shell, the back shell including a semi-spherical body having an outer edge that defines a plane of the back shell.

13. The method of claim 12, wherein mounting the spherical lens and the gimbal assembly in the back shell includes positioning the gimbal assembly and the spherical lens within the back shell with the optical sensor assembly being positioned behind the spherical lens so that the optical sensor assembly has a field of view through the lens.

14. The method of claim 11, further comprising pivoting the body of the first arm with respect to a first axis defined by the position of the first and second end portions of the first arm along a plane, and pivoting the body of the second arm with respect to a second axis defined by the position of the first and second end portions of the second arm along the plane.

15. The method of claim 11, wherein the body of the first arm includes an elongated slot formed therein, and the body of the second arm includes an elongated slot formed therein, wherein the method further comprises positioning the stem of the optical sensor assembly in the slot of the second arm and through the slot of the first arm.

* * * * *